(12) United States Patent
Hayashi et al.

(10) Patent No.: US 8,303,900 B2
(45) Date of Patent: Nov. 6, 2012

(54) EXHAUST GAS PURIFICATION DEVICE

(75) Inventors: Miwa Hayashi, Saitama (JP); Takeshi Miyamoto, Saitama (JP); Fumiyasu Kurogi, Saitama (JP)

(73) Assignee: Bosch Corporation, Toyko (JP)

( * ) Notice: Subject to any disclaimer, the term of this patent is extended or adjusted under 35 U.S.C. 154(b) by 342 days.

(21) Appl. No.: 12/670,727

(22) PCT Filed: May 26, 2008

(86) PCT No.: PCT/JP2008/059623
§ 371 (c)(1),
(2), (4) Date: Jan. 26, 2010

(87) PCT Pub. No.: WO2009/019922
PCT Pub. Date: Feb. 12, 2009

(65) Prior Publication Data
US 2010/0223916 A1 Sep. 9, 2010

(30) Foreign Application Priority Data
Aug. 6, 2007 (JP) .................................. 2007-203753

(51) Int. Cl.
*B01D 50/00* (2006.01)
(52) U.S. Cl. ........................................................ 422/176
(58) Field of Classification Search .................. 422/176, 422/177, 180
See application file for complete search history.

(56) References Cited

U.S. PATENT DOCUMENTS

| | | | |
|---|---|---|---|
| 4,213,766 A | * | 7/1980 | Wyatt ................................ 95/78 |
| 8,092,746 B2 | * | 1/2012 | Salasc et al. .................. 422/117 |
| 2007/0012035 A1 | | 1/2007 | Amemiya et al. |

FOREIGN PATENT DOCUMENTS

| | | |
|---|---|---|
| JP | 2001526349 A | 12/2001 |
| JP | 2005155404 A | 6/2005 |
| JP | 2005273580 A | 10/2005 |

* cited by examiner

*Primary Examiner* — Tom Duong
(74) *Attorney, Agent, or Firm* — Michael Best & Friedrich LLP

(57) ABSTRACT

An exhaust gas purification device for an internal combustion engine that has a turn-back portion in an exhaust gas passageway which makes the device compact and causes a reducing agent to be evenly dispersed and flow into a reduction catalyst disposed in an exhaust gas passageway downstream of the turn-back portion. The device has a lid portion that is attached to a side surface of the body portion and the body portion has an outlet opening for the upstream-side exhaust gas passageway and an inlet opening for the downstream-side exhaust gas passageway, and the turn-back portion comprises a space enclosed by the body portion and the lid portion, and a guide portion for directing the flow direction of exhaust gas with which the reducing agent has become mixed toward the is downstream-side exhaust gas passageway is integrally molded in an opposing surface of the lid portion that opposes the inlet opening of the downstream-side exhaust gas passageway.

2 Claims, 7 Drawing Sheets

PRIOR ART

PRIOR ART

EXHAUST GAS PURIFICATION DEVICE

TECHNICAL FIELD

The present invention relates to an exhaust gas purification device for an internal combustion engine and particularly relates to an exhaust gas purification device for an internal combustion engine that is equipped with an exhaust gas passageway having a turn-back portion midway and uses a reduction catalyst disposed inside the exhaust gas passageway downstream of the turn-back portion to reduce and remove $NO_x$ included in exhaust gas.

BACKGROUND ART

Conventionally, particulate matter (hereinafter called PM) and nitrogen oxides (hereinafter called $NO_x$) that promote environmental pollution are included in exhaust gas exhausted from internal combustion engines such as diesel engines, and technologies for removing these substances are known.

Of these, as a technology for removing $NO_x$, there is known a selective catalytic reduction (SCR) exhaust gas purification device that injects a reducing agent upstream of a reduction catalyst disposed in an exhaust gas passageway, causes the reducing agent to flow into the reduction catalyst together with the exhaust gas, breaks down $NO_x$ in the exhaust gas into nitrogen and the like, and releases the nitrogen and the like.

As one aspect of this exhaust gas purification device, there has been proposed a muffler of a structure that has the function of purifying $NO_x$ in the exhaust gas and forcibly turns back the exhaust gas flow direction inside. More specifically, as shown in FIG. 6, there has been disclosed a muffler 301 with an exhaust gas purification function where an oxidation catalyst 311 and an injection nozzle 312 that injects and supplies a liquid reducing agent are disposed in an upstream-side exhaust gas passageway 309, a reduction catalyst 313 and a reducing agent oxidation catalyst 314 are disposed in a downstream-side exhaust gas passageway 310, a ring member 315 disposed with holes 315*a* in its periphery is disposed in a turn-back portion 308, and exhaust gas is caused to flow downstream from the holes 315*a* to generate an exhaust gas flow along a turn-back portion wall surface 308*a* and create a vortex in the vertical surface of the turn-back portion 308 (see patent document 1).

Further, as another aspect of the exhaust gas purification device, there has been proposed an exhaust gas purification device for an internal combustion engine that has excellent exhaust gas purification performance and can be installed well in a limited installation space. More specifically, as shown in FIG. 7, there has been disclosed an exhaust gas purification device 401 for an internal combustion engine where both a DPF 413 and a urea deNO$_x$ catalyst 423 are disposed so that exhaust gas purification device can simultaneously trap particulates and decrease $NO_x$ in the exhaust gas, wherein the DPF 413 and the urea deNO$_x$ catalyst 423 are disposed in parallel (the flow of the exhaust gas is in series) and are communicated by a communication chamber 430 so that the entire exhaust gas purification device 401 is given a U-shape (see patent document 2).

Patent Document 1: JP-A-2005-273580 (claims, FIG. 1)
Patent Document 2: JP-A-2005-155404 (claims, FIG. 1)

DISCLOSURE OF THE INVENTION

Problem that the Invention is to Solve

Incidentally, in order to raise $NO_x$ reduction efficiency, causing the exhaust gas with which the reducing agent has become mixed to flow evenly into the entire inlet surface of the reduction catalyst and utilizing the entire reduction catalyst to cause a reduction reaction is regarded as being desirable. However, in the case of the configurations of the muffler and the exhaust gas purification device described in patent document 1 and patent document 2, the traveling direction of the exhaust gas leading from the turn-back portion or the communication chamber to the downstream-side exhaust gas passageway bends, so it becomes easy for the exhaust gas in the turn-back portion or inside the communication chamber to pass the outside that bends. Consequently, it becomes easy for the exhaust gas with which the reducing agent supplied to the exhaust gas has become mixed to flow along the outside that bends, and the exhaust gas ends up flowing unevenly into the inlet surface of the reduction catalyst disposed in the downstream-side exhaust gas passageway.

Particularly in the case of the muffler described in patent document 1, there is the problem that when the exhaust gas that has passed through the upstream-side exhaust gas passageway flows into the turn-back portion, the space rapidly expands and the flow velocity of the exhaust gas inside the turn-back portion ends up becoming slower, so it becomes difficult for the reducing agent that has been supplied to the exhaust gas inside the turn-back portion to be diffused in the exhaust gas, and it becomes easy for the reducing agent to flow along the outside that bends because of inertial force.

Further, in the exhaust gas purification device of patent document 2, in order to cause the reducing agent to flow evenly into the reduction catalyst, there is disposed a flow guide or the like that creates a distribution of the flow of the exhaust gas inside the turn-back portion, but this flow guide has a configuration where a plate-like guide plate is fixed by welding or the like to the wall surface of the communication chamber 430, and there is the potential for this to take effort in terms of manufacture and for it to become easier for the spray of the reducing agent to adhere thereto and crystallize.

Thus, the inventors of the present invention made every effort to discover that this problem can be solved by integrally molding, in a predetermined position of a lid portion, a guide portion for directing the flow of the exhaust gas with which the reducing agent is mixed to the downstream-side exhaust gas passageway in an exhaust gas purification device that has a turn-back portion in an exhaust gas passageway, and thus completed the present invention. That is, it is an object of the present invention to provide an exhaust gas purification device for an internal combustion engine that has a turn-back portion in an exhaust gas passageway and is made compact and can cause a reducing agent to be evenly dispersed and flow into a reduction catalyst disposed in an exhaust gas passageway downstream of the turn-back portion.

Solution to the Problem

According to the present invention, there is provided an exhaust gas purification device comprising: an exhaust gas passageway that has a turn-back portion; a reducing agent supply portion that is disposed in the turn-back portion and supplies a reducing agent to the inside of the exhaust gas passageway; and a reduction catalyst that is disposed in the exhaust gas passageway downstream of the turn-back portion and uses the reducing agent to reduce and purify nitrogen oxides, wherein the exhaust gas purification device has a housing that includes a body portion in which an upstream-side exhaust gas passageway and a downstream-side exhaust gas passageway are housed and a lid portion that is attached to a side surface of the body portion that has an outlet opening for the upstream-side exhaust gas passageway and an inlet opening for the downstream-side exhaust gas passageway, the turn-back portion comprises a space enclosed by the body portion and the lid portion, and a guide portion for directing the flow direction of exhaust gas with which the reducing agent has become mixed toward the downstream-side exhaust gas passageway is integrally molded in an opposing surface of the lid portion that opposes the inlet opening of the downstream-side exhaust gas passageway, and so the aforementioned problem can be solved.

Further, in configuring the exhaust gas purification device of the present invention, it is preferred that the guide portion includes a plurality of guide portions that are arrayed concentrically about the outlet opening of the upstream-side exhaust gas passageway.

Further, in configuring the exhaust gas purification device of the present invention, it is preferred that the guide portion is a plurality of step portions or recessed portions that are formed in the lid portion such that part of the opposing surface sticks out toward the downstream-side exhaust gas passageway.

Advantageous Effects of the Invention

According to the exhaust gas purification device for an internal combustion engine of the present invention, in an exhaust gas purification device where an exhaust gas passageway is turned back midway so that the entire device is made compact, the flow of the exhaust gas with which the reducing agent is mixed that passes the front surface of the inlet opening of the downstream-side exhaust gas passageway inside the turn-back portion can be directed toward the downstream-side exhaust gas passageway. Consequently, the exhaust gas with which the reducing agent is mixed can be evenly distributed and caused to flow into the inlet surface of the reduction catalyst disposed in the downstream-side exhaust gas passageway, and $NO_x$ reduction efficiency can be improved.

Further, the exhaust gas purification device has a configuration where the guide portion is integrally molded in the lid portion, so molding is easy in the manufacturing stage, and effort such as welding can be omitted.

BEST MODE FOR CARRYING OUT THE INVENTION

Figure 1:
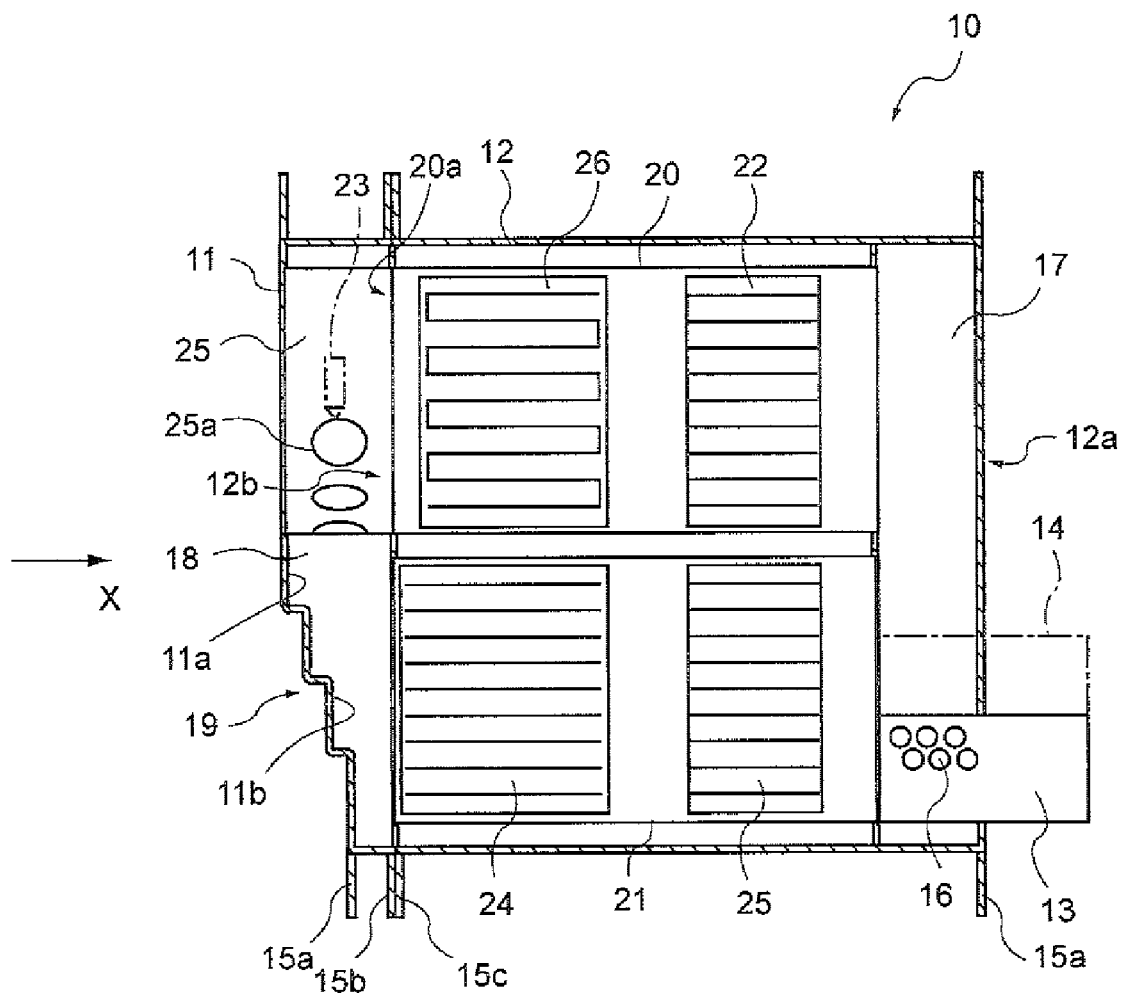
FIG. 1 is a diagram for describing the configuration of an exhaust gas purification device of an embodiment of the present invention.

An embodiment relating to an exhaust gas purification device of the present invention will be specifically described below with reference to the drawings. However, this embodiment represents one aspect of the present invention, is not intended to limit this invention, and is capable of being arbitrarily altered within the scope of the present invention.

It will be noted that members to which the same reference numerals have been given in the drawings represent the same members and that description thereof will be appropriately omitted.

1. Exhaust Gas Purification Device (Muffler)

FIG. 1 shows one example of the internal structure of an exhaust gas purification device 10 pertaining to the embodiment of the present invention, and the exhaust gas purification device 10 is configured to have a muffling function.

This exhaust gas purification device 10 has a housing that is configured by a body portion 12 and a lid portion 11, and the exhaust gas purification device 10 is square overall. On the outer periphery of the housing, there are disposed plural fixing flange portions 15a for fixing the exhaust gas purification device 10 to a vehicle. Further, flange portions 15b and 15c are respectively disposed on the body portion 12 and the lid portion 11, and the body portion 12 and the lid portion 11 are fixed to each other using unillustrated screws or the like.

Of these, in a side surface (surface on the right side in the drawing) 12a of the body portion 12, there are disposed an exhaust gas inflow portion 13 and an exhaust gas exhaust portion 14 (indicated by a two-dotted chain line in the drawing). Further, inside the body portion 12, there are formed an expansion chamber 17 that is communicated with the exhaust gas inflow portion 13 via numerous holes 16 formed in the exhaust gas inflow portion 13, a turn-back portion 18 that turns back the flow of exhaust gas on a side surface 12b on the opposite side of the side surface 12a on the side where the expansion chamber 17 is disposed, an upstream-side exhaust gas passageway 20 that allows the expansion chamber 17 and the turn-back portion 18 to be communicated, and a downstream-side exhaust gas passageway 21 that allows the turn-back portion 18 and the exhaust gas exhaust portion 14 to be communicated. The turn-back portion 18 comprises a space enclosed by the side surface 12b of the body portion 12 and an inner surface 11a of the lid portion 11 and also has a function as an expansion chamber for exhaust gas that flows in via the upstream-side exhaust gas passageway 20.

Because the exhaust gas passageway is turned back in this manner, the entire length of the exhaust gas purification device 10 is shortened and the entire device is compact.

In the upstream-side exhaust gas passageway 20, there are disposed an upstream oxidation catalyst 22 and a diesel particulate filter 26. The diesel particulate filter 26 is for trapping particulates such as particulate matter included in the exhaust gas and is disposed downstream of the upstream oxidation catalyst 22. Further, the upstream oxidation catalyst 22 oxidizes NO in the exhaust gas to generate $NO_2$, which easily reacts with a reducing agent, and oxidizes carbon monoxide (CO) to generate carbon dioxide ($CO_2$), with the percentages of CO and $CO_2$ being adjusted such that $NO_x$ reduction efficiency in a reduction catalyst 24 is optimized. Further, the upstream oxidation catalyst 22 can utilize the oxidation heat that is generated when these oxidation reactions occur to raise the temperature of the exhaust gas.

In an outlet opening 20a of the upstream-side exhaust gas passageway 20, there is disposed a first ring-shaped member 25 that has plural holes 25a serving as open portions in its circumferential direction and regulates the flow direction of the exhaust gas that flows into the turn-back portion 18 from the upstream-side exhaust gas passageway 20 via the holes 25a.

Further, in the downstream-side exhaust gas passageway 21, there are disposed a reduction catalyst 24 and a downstream oxidation catalyst 25. The reduction catalyst 24 is used in order to reduce and purify, with a reducing agent, $NO_x$ included in the exhaust gas. Further, the downstream oxidation catalyst 25 is used in order to oxidize and purify the liquid reducing agent that has passed through the reduction catalyst 24 and is disposed downstream of the reduction catalyst 24. For the upstream oxidation catalyst 22, the downstream oxidation catalyst 25, the diesel particulate filter 26 and the reduction catalyst 24, there can be used publicly known catalysts and filters.

Further, in the turn-back portion 18, there is disposed an unillustrated diffusion plate and there is also disposed a reducing agent supply portion 23 that injects and supplies the liquid reducing agent such as a urea solution or hydrocarbon. This reducing agent supply portion 23 comprises an injection nozzle that is connected to an air assist reducing agent supply device and a reducing agent injection valve that directly injects the reducing agent that has been pressure-fed, and the reducing agent supply portion 23 is configured such that the reducing agent is supplied upstream of the diffusion plate. The disposed position of the reducing agent supply portion 23 is not particularly limited, but it is preferable to dispose the reducing agent supply portion 23 in consideration of the efficiency with which it disperses the reducing agent into the exhaust gas.

Further, in the exhaust gas purification device 10 of the present embodiment, in the lid portion 11 that configures the turn-back portion 18, there is integrally molded a guide portion 19 for directing the flow of the exhaust gas with which the reducing agent is mixed that passes through the inside of the turn-back portion 18 toward the downstream-side exhaust gas passageway 21 in which the reduction catalyst 24 is disposed. For that reason, variations in the flow rate distribution of the exhaust gas with which the reducing agent is mixed that passes through the turn-back portion 18, is guided toward the downstream-side exhaust gas passageway 21 and flows into an inlet surface of the reduction catalyst 24 are controlled. The shape of this guide portion 19 is not particularly limited as long as the guide portion 19 has a shape that can impart resistance to the exhaust gas with which the reducing agent is mixed and can partially raise or lower the pressure of the exhaust gas; the guide portion 19 can be configured in various forms.

Figure 2:
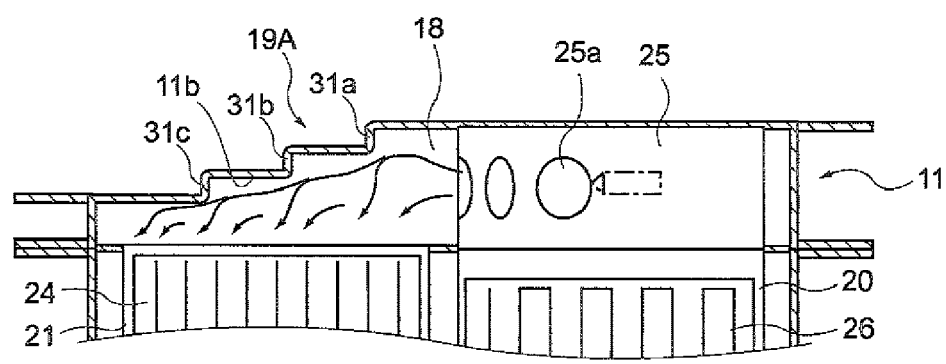
FIG. 2 is a diagram for describing an example of a guide portion that comprises step portions integrally molded with a lid portion.
Figure 2:
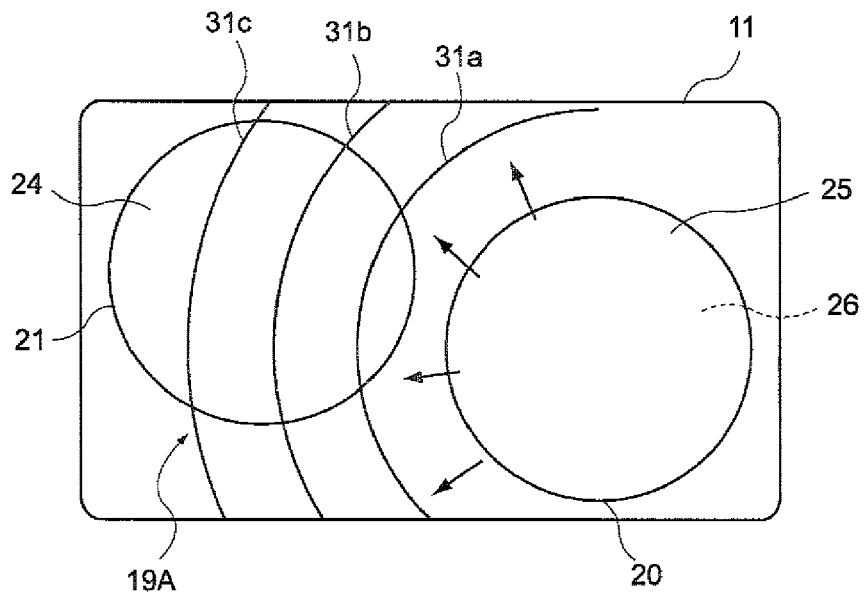
Figure 3:
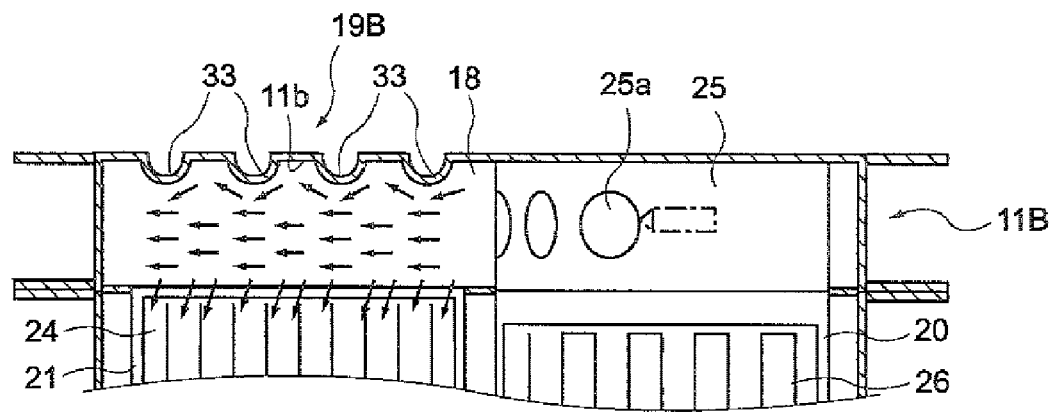
FIG. 3 is a diagram for describing an example of a guide portion that comprises recessed portions integrally molded with the lid portion.
Figure 3:
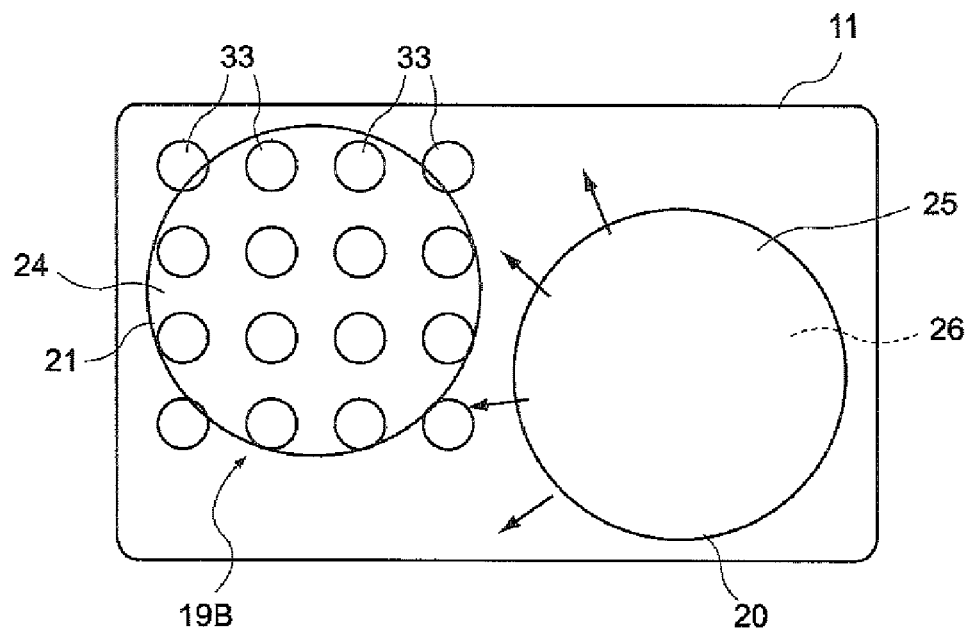
Figure 4:
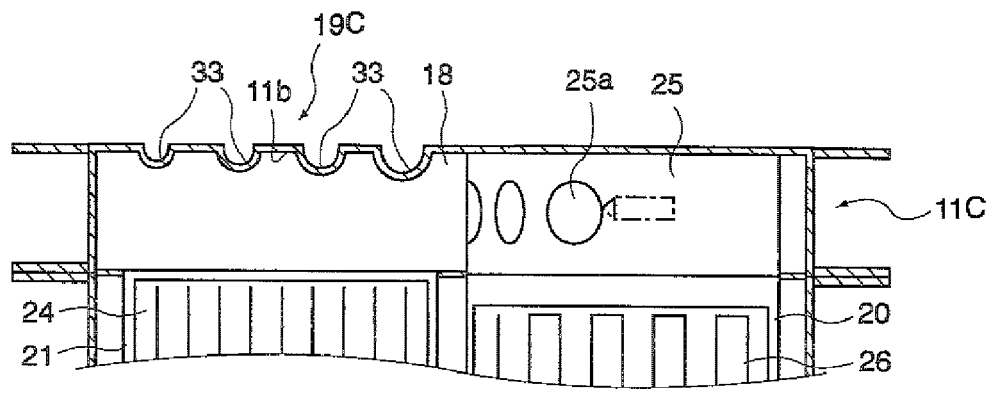
FIG. 4 is a diagram for describing examples of configurations of guide portions that comprise the recessed portions.
Figure 4:
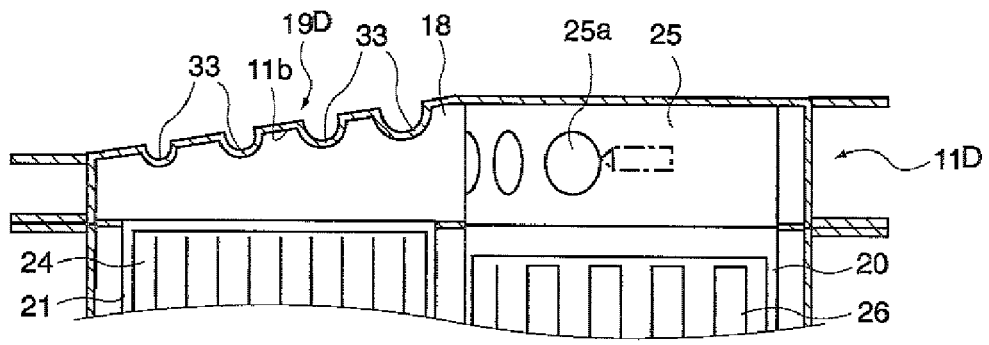
Figure 5:
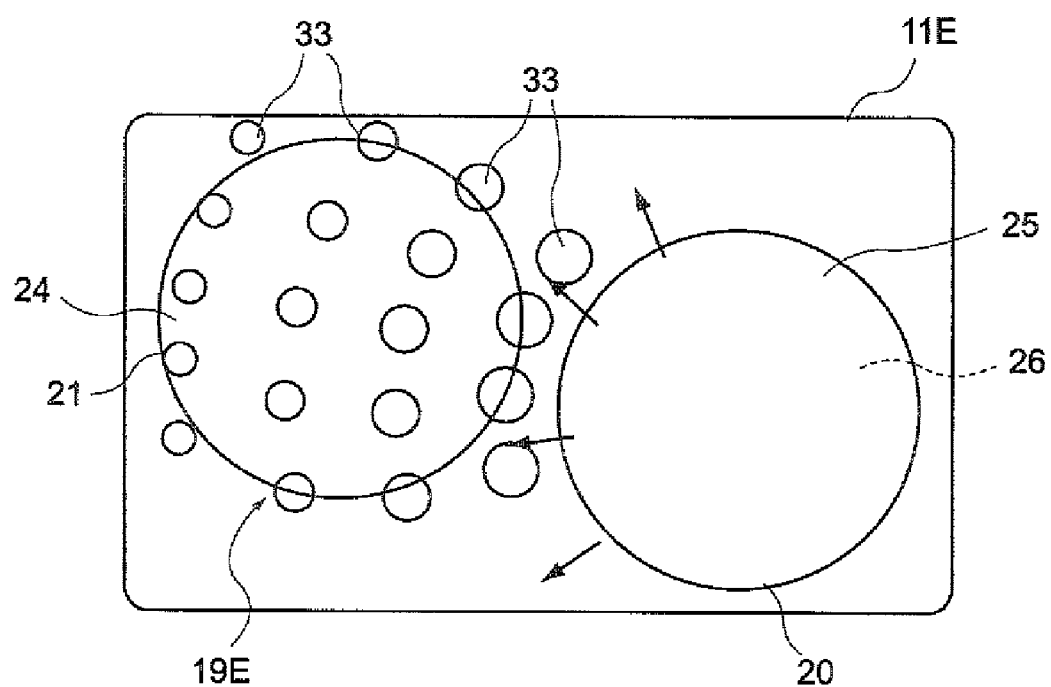
FIG. 5 is a diagram for describing an example of the arrangement of guide portions that comprise the recessed portions.
Figure 6:
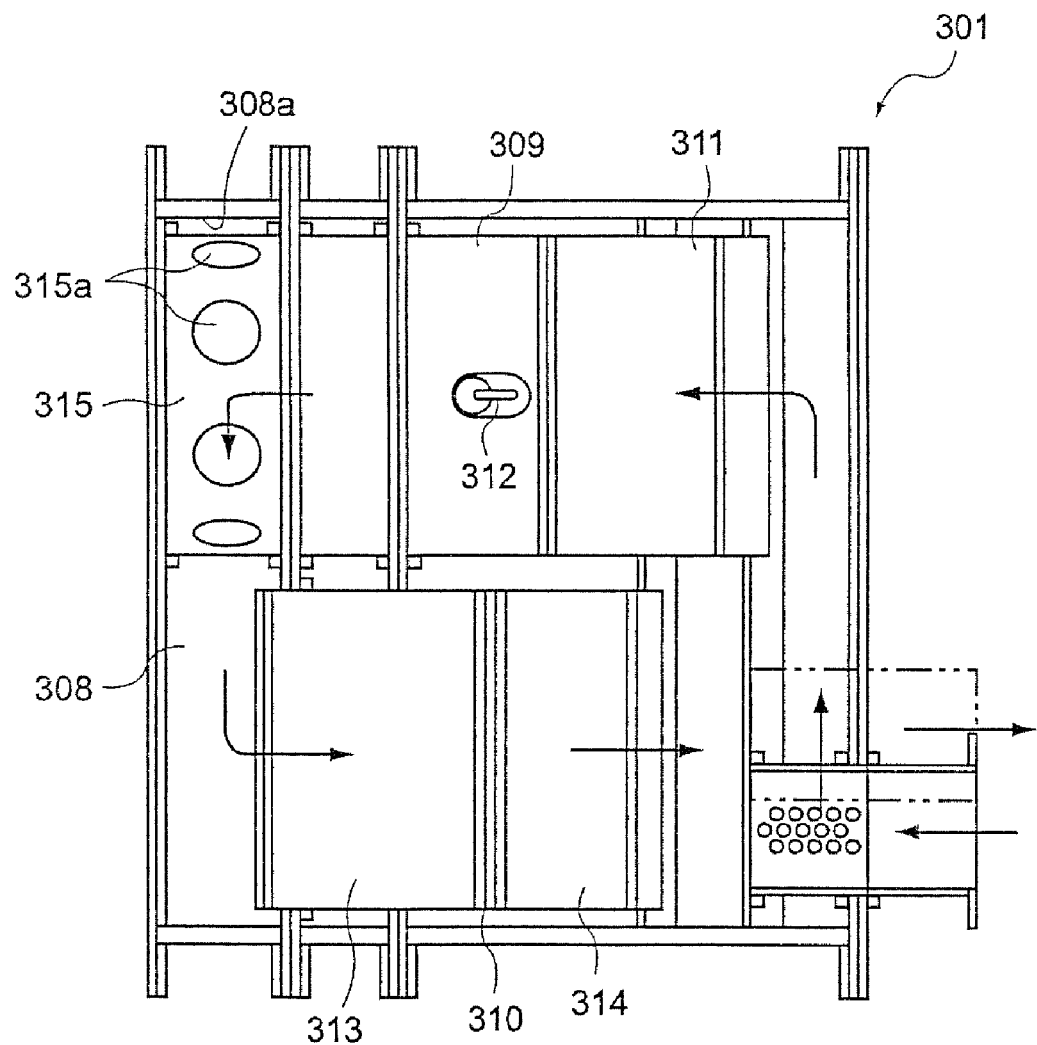
FIG. 6 is a diagram for describing the configuration of a conventional muffler having an exhaust gas purification function.
Figure 7:
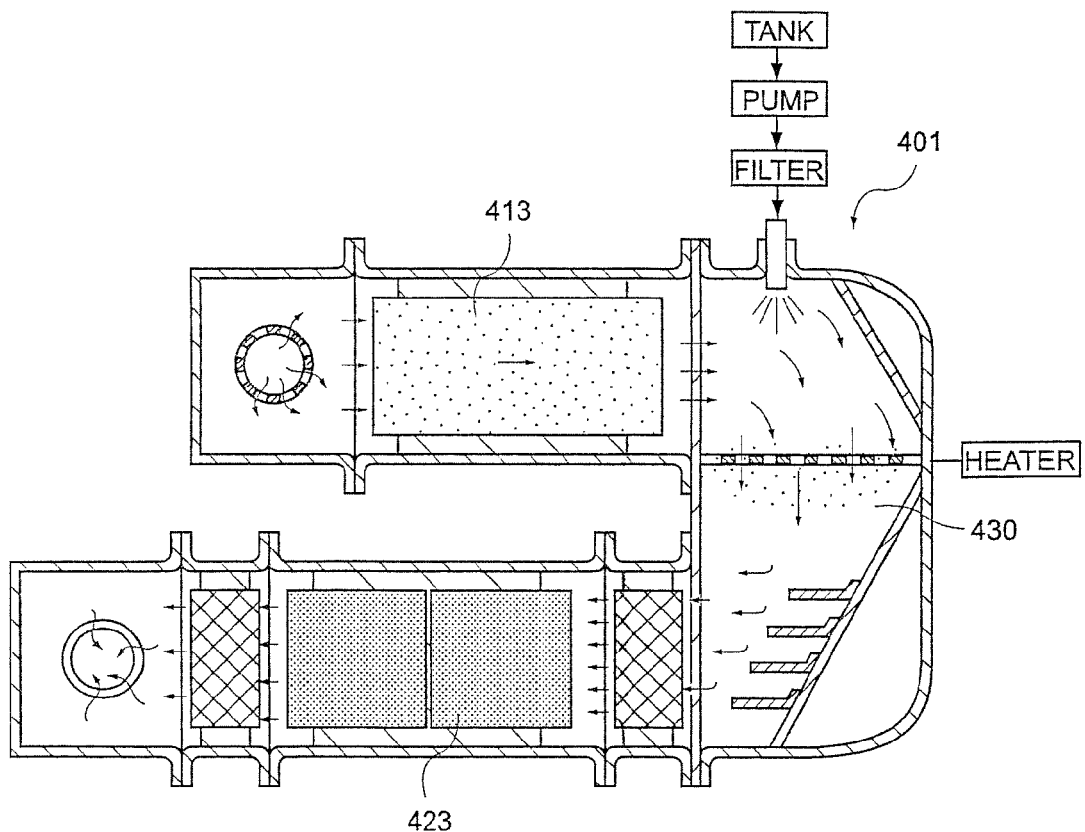
FIG. 7 is a diagram for describing the configuration of a conventional exhaust gas purification device.

Examples of the configuration of the guide portion 19 that is integrally molded in the lid portion 11 will be described below on the basis of FIG. 2 to FIG. 5. FIG. 2(a) is a cross-sectional diagram showing the area around the turn-back portion 18 of the exhaust gas purification device 10 shown in FIG. 1, and FIG. 2(b) is a plan diagram showing the lid portion 11 that configures the turn-back portion 18 of the exhaust gas purification device 10 shown in FIG. 1 as seen from the direction of arrow X. Further, FIG. 3 to FIG. 5 are diagrams showing lid portions 11B to 11E with which guide portions 19B to 19E of other configurations are integrally molded and are cross-sectional diagrams and plan diagrams respectively corresponding to FIG. 2(a) and FIG. 2(b).

FIG. 2) and FIG. 2(b) are an example of a guide portion 19A where a first step portion 31a, a second step portion 31b and a third step portion 31c are disposed in an opposing surface 11b opposing the inlet surface of the reduction catalyst 24 such that they stick out toward the reduction catalyst 24. These first to third step portions 31a to 31c are given a stepwise shape such that, as shown in FIG. 2(a), the height of the steps (the extent to which the steps stick out from the opposing surface 11b) gradually becomes higher from upstream to downstream of the flow of the exhaust gas. Consequently, the exhaust gas with which the reducing agent has become mixed encounters resistance each time it collides with the first to third step portions 31a to 31c, and the exhaust gas passes through the turn-back portion 18 while the flow direction of some of the exhaust gas is changed downward.

Further, as shown in FIG. 2(b), the first to third step portions 31a to 31c are formed concentrically about the outlet opening of the upstream-side exhaust gas passageway 20. By forming the guide portion 19A concentrically, the exhaust gas with which the reducing agent is mixed that flows in all directions can be caused to collide with the guide portion 19A at constant intervals.

It will be noted that the number and height of the step portions can be appropriately set.

Further, FIG. 3(a) and FIG. 3(b) are an example of a guide portion 19B where plural recessed portions 33 are disposed in the opposing surface 11b opposing the inlet surface of the reduction catalyst 24 such that they stick out toward the reduction catalyst 24. These plural recessed portions 33 are, shown in FIG. 3(a), formed in hemispherical shapes. Further, as shown in FIG. 3(b), the recessed portions 33, which are of the same size, are evenly arranged four-by-four in the opposing surface 11b opposing the inlet surface of the reduction catalyst 24.

In the case of this guide portion 198 in which the recessed portions 33 are formed, the flow of the exhaust gas with which the reducing agent is mixed that passes the opposing surface 11b is interrupted by the recessed portions 33 and directed to the inlet surface of the downstream-side exhaust gas passageway 21. As a result, in the region where the recessed portions 33 are formed, it becomes easier for a flow of the exhaust gas with which the reducing agent is mixed to be formed toward the inlet surface of the downstream-side exhaust gas passageway 21, and it becomes easier for the exhaust gas with which the reducing agent is mixed to flow into the downstream-side exhaust gas passageway 21 in comparison to when there are no recessed portions.

In this manner, by disposing the plural recessed portions 33 in the inner surface of the lid portion 11B, in the region where the recessed portions 33 are formed, the exhaust gas with which the reducing agent is mixed collides with the recessed portions 33 and flows toward the downstream-side exhaust gas passageway 21, so it becomes easier to cause the exhaust gas with which the reducing agent is mixed to flow evenly into the entire inlet surface of the reduction catalyst 24 disposed in the downstream-side exhaust gas passageway 21.

When the guide portion is configured as a guide portion that comprises plural recessed portions, the number, size, disposed positions, planar shape or three-dimensional shape of the recessed portions, and also the configuration of the opposing surface of the lid portion in which the recessed portions are integrally molded, can be appropriately changed.

For example, FIG. 4(a) is an example of a guide portion 19C configured such that the sizes of the recessed portions 33 become smaller downstream (toward the left side in the diagram) and the passageway area of the exhaust gas passageway narrowed and formed by the recessed portions 33 becomes larger downstream of the flow of the exhaust gas with which the reducing agent is mixed. Further, FIG. 4(b) is an example of a guide portion 19D where, in the configuration of FIG. 4(a), the opposing surface 11b of a lid portion 11D opposing the inlet opening in the downstream-side exhaust gas passageway is given a slanted shape.

Moreover, FIG. 5 is an example of a guide portion 19E where the disposed positions of the plural recessed portions 33 are arranged concentrically about the outlet opening of the upstream-side exhaust gas passageway 20.

As exemplified in these, various forms are conceivable for the configuration of the guide portion that is integrally molded with the lid portion, but it is preferable to apply computational fluid dynamics (CFD) to analyze the flow of the exhaust gas with which the reducing agent is mixed that passes through the turn-back portion and to design the configuration of the guide portion in accordance with the form of the turn-back portion.

Next, the flow of the exhaust gas in the exhaust gas purification device 10 of the present embodiment will be described with reference to FIG. 1.

First, the exhaust gas flowing in from the exhaust gas inflow portion 13 flows into the expansion chamber 17 via the numerous holes 16 and also flows into the upstream-side exhaust gas passageway 20. The exhaust gas flowing into the upstream-side exhaust gas passageway 20 passes through the upstream oxidation catalyst 22, whereby NO in the exhaust gas is oxidized and $NO_2$, which more easily produces a reduction reaction, is generated. Thereafter, when the exhaust gas passes through the diesel particulate filter 26, particles in the exhaust gas are trapped, and the exhaust gas is guided inside the turn-back portion 18.

Inside the turn-back portion 18, the liquid reducing agent is injected and supplied from the reducing agent supply portion 23. The exhaust gas with which the liquid reducing agent has become mixed flows through the inside of the turn-back portion 18 toward the downstream-side exhaust gas passageway 21, but because the flow direction of the exhaust gas inside the turn-back portion 18 and the flow direction of the exhaust gas inside the downstream-side exhaust gas passageway 21 bend, it becomes easier for the exhaust gas with which the reducing agent is mixed to flow along the opposing surface 11b opposing the inlet surface of the reduction catalyst 24. This opposing surface 11b is equipped with the guide portion 19 integrally molded with the lid portion 11, and the exhaust gas with which the reducing agent is mixed that flows along the opposing surface 11b flows toward the downstream-side exhaust gas passageway 21. For that reason, it becomes easier for the exhaust gas with which the reducing agent is mixed to flow into the inlet surface of the reduction catalyst 24 in an evenly dispersed state.

Inside the reduction catalyst 24, ammonia and $NO_x$ generated as a result of the reducing agent being hydrolyzed react and are broken down into nitrogen, water and the like. As mentioned above, the exhaust gas with which the reducing agent is mixed disperses and flows into the entire inlet surface of the reduction catalyst 24, so the entire surface of the reduction catalyst 24 can be utilized to cause $NO_x$ to undergo a reduction reaction. The downstream oxidation catalyst 25 is disposed downstream of the reduction catalyst 24, so the portion of the generated ammonia that was not utilized for $NO_x$ reduction is oxidized, and the ammonia is released as is into the atmosphere.

Thereafter, the exhaust gas in which $NO_x$ has been decreased is led out from the exhaust gas exhaust portion 14.

It will be noted that the upstream oxidation catalyst 22, the particulate filter 26 and the downstream oxidation catalyst 25 other than the reduction catalyst 24 disposed in the downstream-side exhaust gas passageway can be appropriately omitted. In this case, as long as space is ensured in the upstream-side exhaust gas passageway 20, the upstream-side exhaust gas passageway 20 can also be equipped with the injection nozzle and the reducing agent injection valve serving as the reducing agent supply portion 23. Even when the reducing agent supply portion 23 is disposed in the upstream-side exhaust gas passageway 20, the exhaust gas with which the reducing agent is mixed passes through the turn-back portion 18 disposed with the guide portion 19 integrally molded with the lid portion and flows into the downstream-side exhaust gas passageway 21, so the exhaust gas with which the reducing agent is mixed can be caused to flow into the inlet surface of the reduction catalyst 24 disposed in the downstream-side exhaust gas passageway 21 in a state where the reducing agent is evenly dispersed.

The invention claimed is:

1. An exhaust gas purification device comprising:
    a housing that includes a body portion in which an upstream-side exhaust gas passageway and a downstream-side exhaust gas passageway are housed, the housing providing;
    an exhaust gas passageway that has a turn-back portion;
    a reducing agent supply portion that is disposed in the turn-back portion and supplies a reducing agent to an inside of the exhaust gas passageway;
    a reduction catalyst that is disposed in the exhaust gas passageway downstream of the turn-back portion and which uses the reducing agent to reduce and purify nitrogen oxides;
    a ring-shaped member is disposed in an outlet opening of the upstream-side exhaust gas passageway which has plural holes serving as open portions in its circumferential direction, and which regulates the flow direction of the exhaust gas that flows into the turn-back portion from the upstream-side exhaust gas passageway via the holes;
    the housing including a body portion in which the upstream-side exhaust gas passageway and the downstream-side exhaust gas passageway are housed, the body portion including a side surface, and wherein the housing includes a lid portion that is attached to the side surface of the body portion,
    wherein the outlet opening for the upstream-side exhaust gas passageway and an inlet opening for the downstream-side exhaust gas passageway are provided,
    wherein the turn-back portion comprises a space enclosed by the body portion and the lid portion of the housing, and guide means for directing a flow direction of exhaust gas with which the reducing agent has become mixed toward the downstream-side exhaust gas passageway, which guide means is integrally molded in an inner surface of the lid portion that opposes the inlet opening of the downstream-side exhaust gas passageway, and which guide means include a plurality of guide members that are arrayed concentrically about the outlet opening of the upstream-side exhaust gas passageway.

2. The exhaust gas purification device according to claim 1, wherein the guide means are a plurality of step portions or recessed portions that are formed in the lid portion such that part of the opposing surface sticks out toward the downstream-side exhaust gas passageway.

* * * * *